United States Patent [19]

Rodal

[11] Patent Number: 4,481,449
[45] Date of Patent: Nov. 6, 1984

[54] POWER FAIL SERVO SYSTEM

[75] Inventor: David R. Rodal, Palo Alto, Calif.

[73] Assignee: Ampex Corporation, Redwood City, Calif.

[21] Appl. No.: 436,904

[22] Filed: Oct. 27, 1982

Related U.S. Application Data

[63] Continuation-in-part of Ser. No. 1,287, Sep. 17, 1982.

[51] Int. Cl.³ .......................... H02P 3/14; H02P 3/18
[52] U.S. Cl. ..................................... 318/375; 318/60; 318/134; 318/138; 318/258; 318/327; 360/71; 360/74.1
[58] Field of Search ............... 318/135, 313, 314, 317, 318/327, 256, 258, 269, 138, 60, 59, 374, 375, 376; 340/660, 663; 361/92; 360/71, 72.2, 1, 75; 242/190

[56] References Cited

U.S. PATENT DOCUMENTS

| | | | |
|---|---|---|---|
| 3,117,262 | 1/1964 | Mullin | 318/258 X |
| 3,130,357 | 4/1964 | Westlake et al. | 318/56 X |
| 3,218,529 | 11/1965 | Evans et al. | 318/60 X |
| 3,463,984 | 8/1969 | Ross et al. | 318/134 X |
| 3,852,731 | 12/1974 | Hollands | 340/663 |
| 3,879,756 | 4/1975 | DeBell et al. | 360/74.1 |
| 3,942,084 | 3/1976 | Louth | 318/327 X |
| 4,027,204 | 5/1977 | Norbeck | 361/92 X |
| 4,031,463 | 6/1977 | Norberg | 318/138 X |
| 4,031,464 | 6/1977 | Norberg | 361/92 X |
| 4,156,257 | 5/1979 | Roberts | 360/71 |

OTHER PUBLICATIONS

Electronic Design, May 24, 1979, "One-Shot Serving as Missing Pulse Detector Spots Loss of AC Line Voltage Quickly".

Primary Examiner—J. V. Truhe
Assistant Examiner—Paul S. L. Ip
Attorney, Agent, or Firm—George B. Almeida; Joel D. Talcott

[57] ABSTRACT

A power fail circuit provides protection for tape such as used in the tape transport apparatus of a video recorder in the event of a failure of the external power supply. The tape transport apparatus includes as a feature the provision of an electrical error signal used to govern drive motors to maintain substantially constant tape tension when the system is operating normally. After power failure occurs, the power fail circuit continues to respond to the error signal by coupling current from the drive motors to provide dynamic braking. Further, current taken from the drive motors selectively is coupled to an energy storage device operatively associated with the system power supply, to provide augmenting energy from the kinetic energy of the motors for continued control of the power fail circuit as the drive motors are caused to decelerate under control to stop.

24 Claims, 6 Drawing Figures

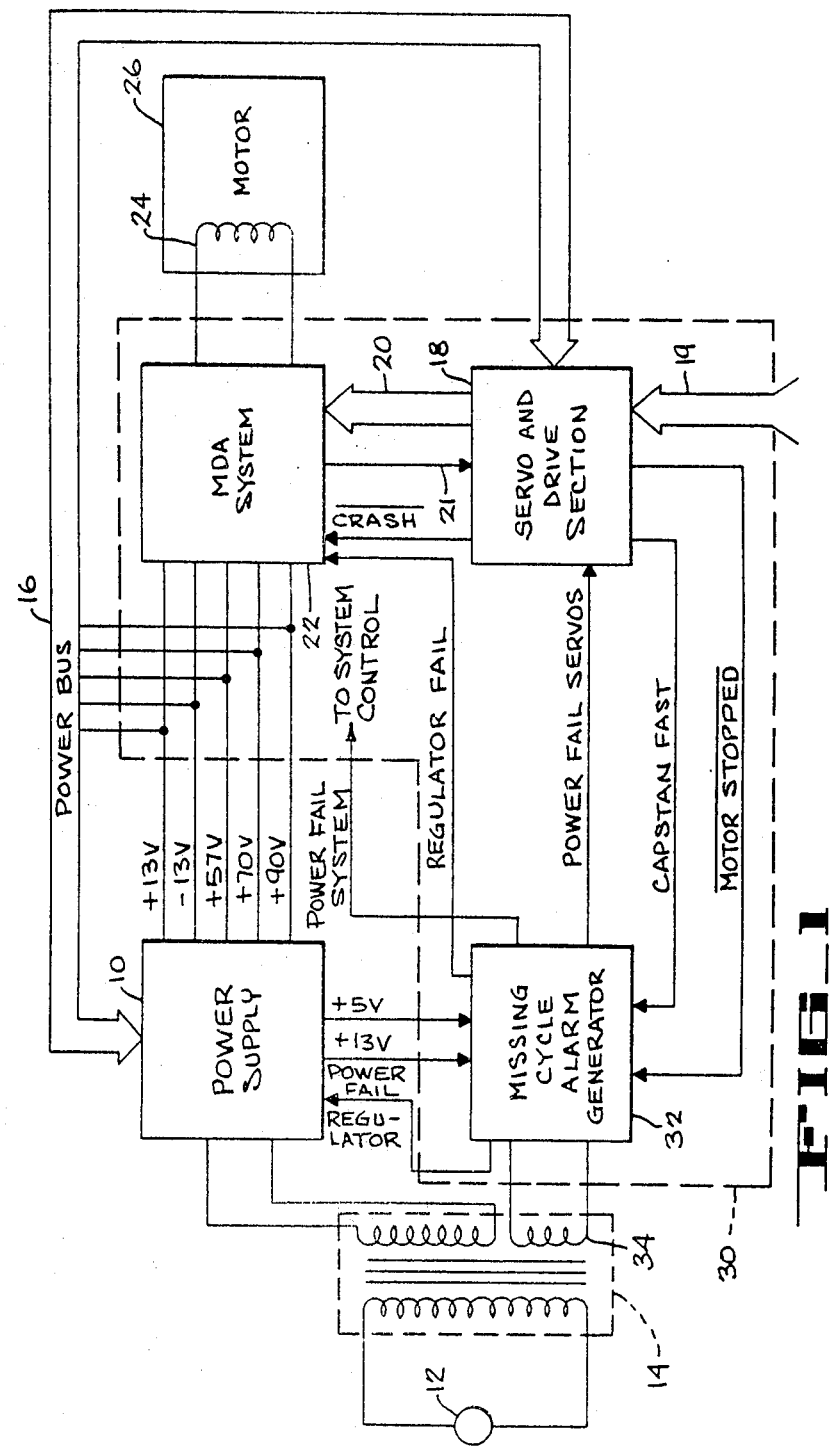

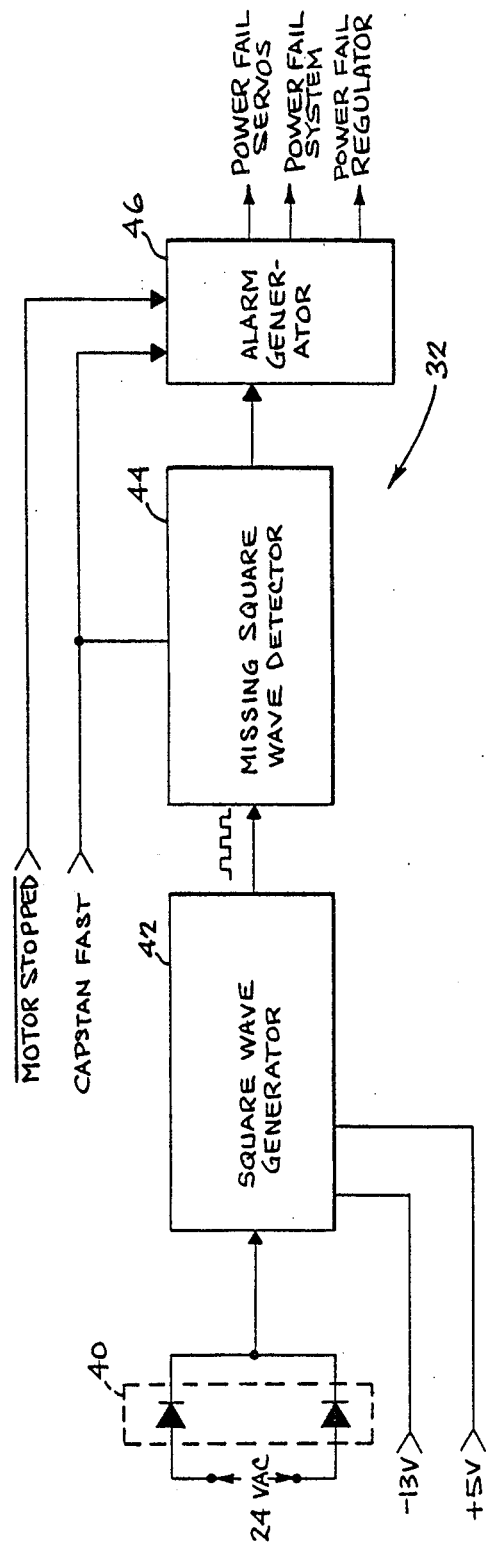
FIG_2

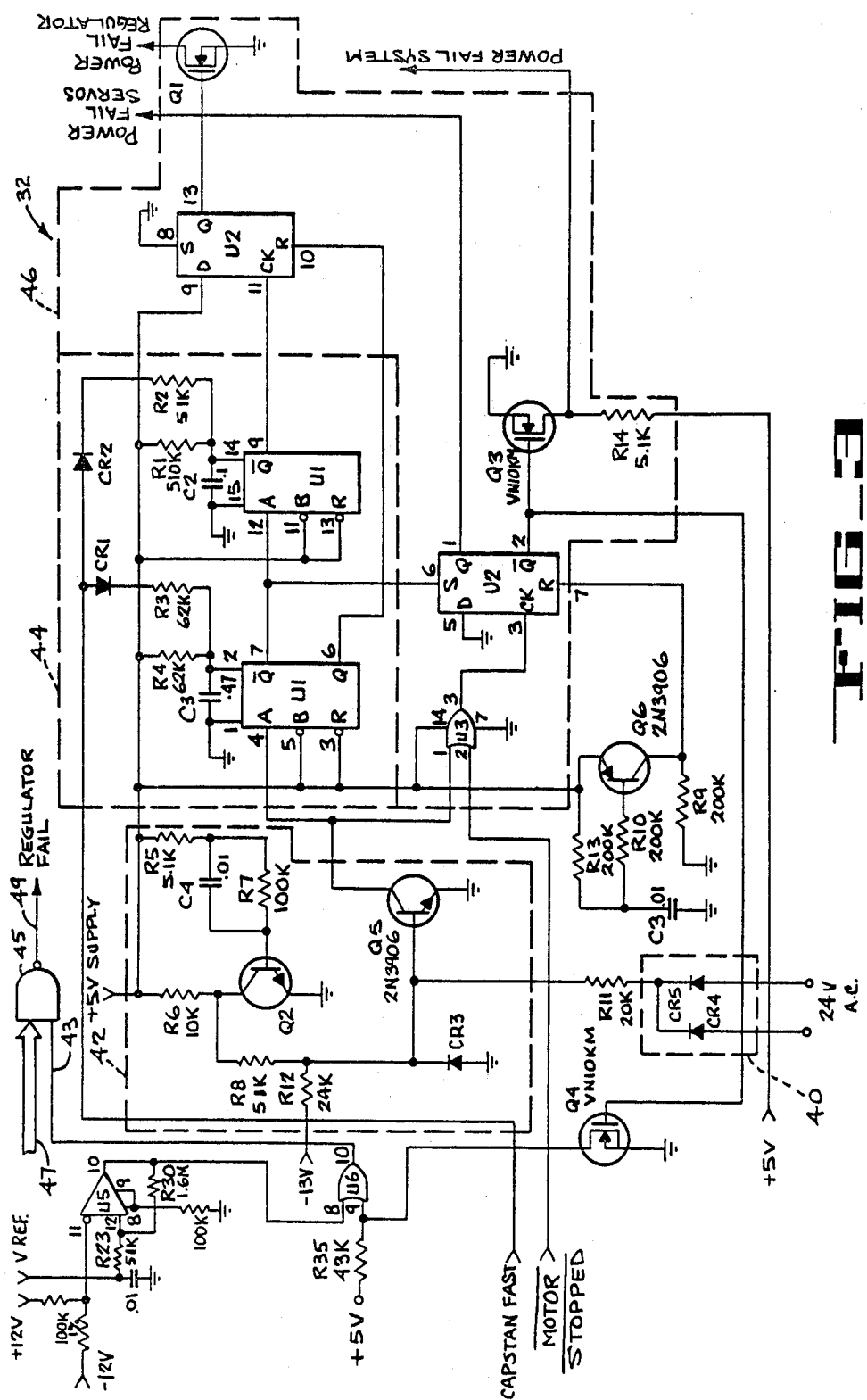

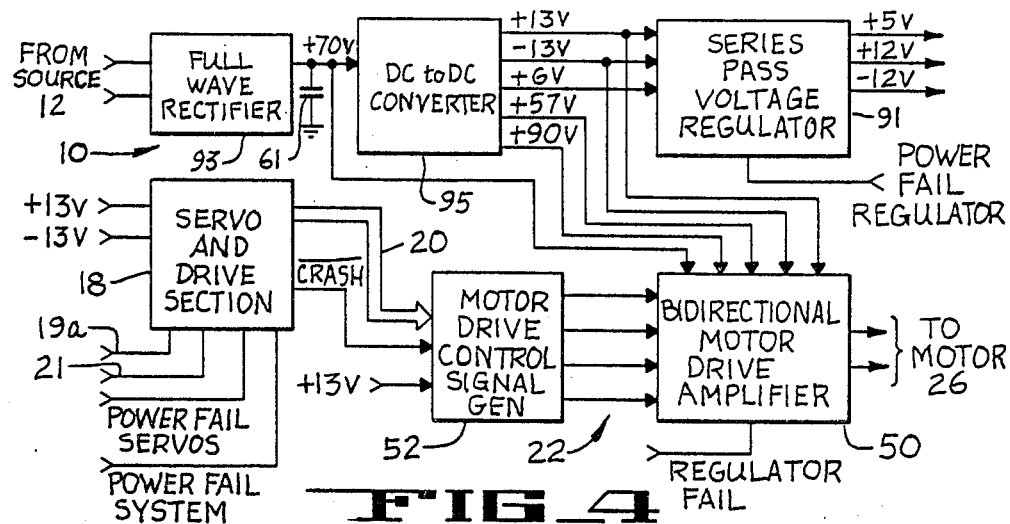
FIG_4
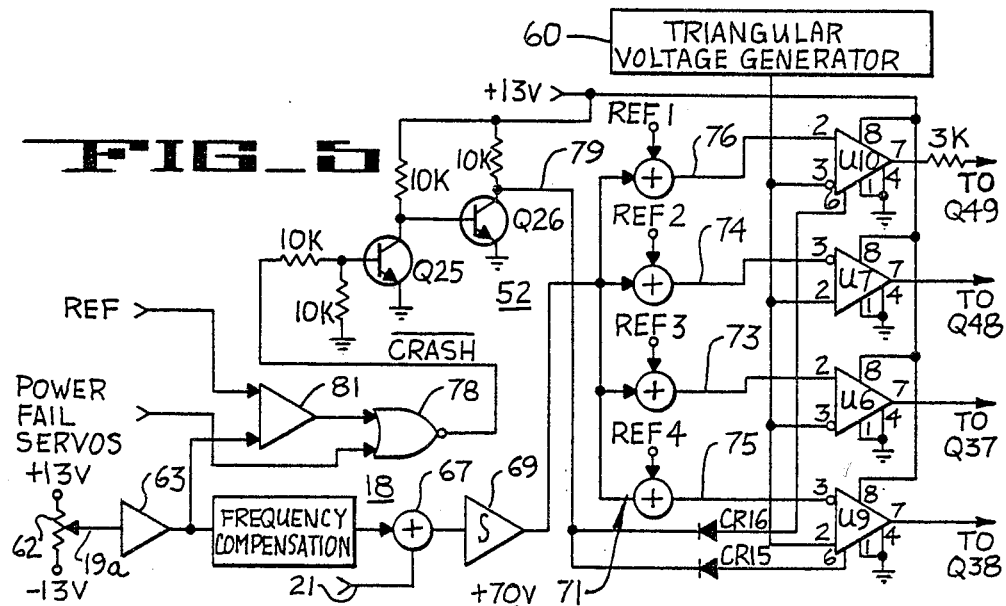
FIG_5
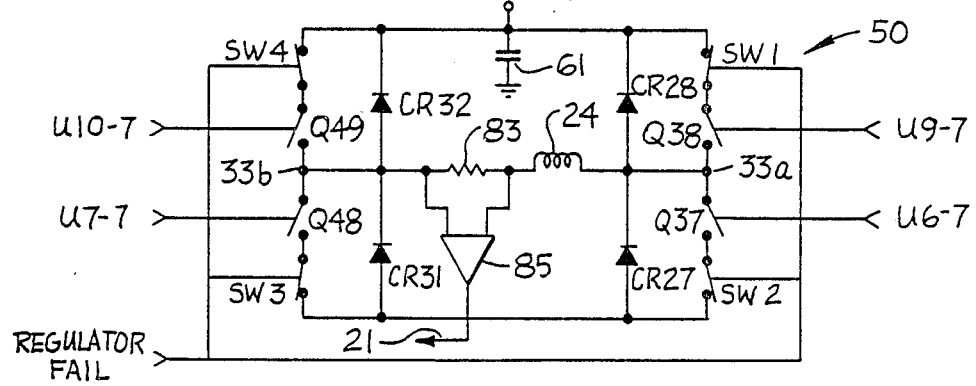
FIG_6

POWER FAIL SERVO SYSTEM

This is a continuation-in-part of International Application under the Patent Cooperation Treaty PCT/US82/01287, filed Sept. 17, 1982, which designated the United States of America.

This invention relates generally to motor servo systems such as used in tape recording and reproducing apparatus. More particularly, this invention relates to dynamic braking circuitry for effecting the controlled deceleration to stop of motor when power is lost.

BACKGROUND OF THE INVENTION

Tape recording and reproducing machines generally have tape transported between a supply reel and a take-up reel. The reels are motor driven and the motors are controlled by servos to maintain a predetermined tension on the tape. The tape is moved at relatively slow speed during recording and reproducing and can be moved very rapidly during a shuttle operation. Tape speeds of approximately 600 inches per second during shuttle operation are known in broadcast quality video tape recording and reproducing apparatus.

During high speed shuttle operations, the tape is often driven by the reels which are in turn controlled by reel servo systems.

In the event of a power failure, the driving motors eventually stop, largely as a result of frictional retarding forces. The retarding forces may be generated within each motor and at places contacted by the moving tape. Because of these forces, the tape may be subjected to substantial and varying tensile loadings. These loadings are undesirable because they may physically damage the tape or cause pressure erasure of magnetic signals recorded on the tape. Additionally, the inertia of the takeup reel may be less than that of the supply reel because of differences in the quantity of tape stored on the reels at the time of a power failure, whereby the supply reel rotates at a speed relative to that of the take-up reel which discharges tape at a rate greater than that at which the take-up reel is capable of receiving tape. As a result, tape may be spilled during stopping instead of being taken up on the take-up reel. The possibilities of tape spillage from the supply reel and accompanying tape damage become especially likely during shuttle operations because of the very high speeds involved.

Tape reels of existing tape recording and reproducing machines are generally equipped with mechanical brakes which are often released by a solenoid in the event of a power failure. Typically, the mechanical brakes operate differentially in that they exert greater braking torque upon the reel when supplying tape than upon the reel when receiving tape. Dynamic brakes also have been employed in tape transports wherein the motor current resulting from the back EMF of the motor effects braking of the motor upon the occurrence of a failure.

While such brakes have generally been satisfactory for use in longitudinal audio and quadruplex video recording and reproducing machines, they often provide less than satisfactory performance in helical wrap recording and reproducing machines. The helical wrap machines have tension problems which are aggravated, for example, by the use of a large heavy duty tape reel together with a small light weight plastic reel that many users find convenient. In addition, the difference in the inertias of the two reels due to continuously varying differences in the tape packs on the reels at any point in time, can cause corresponding continuously varying differences in the dynamic braking requirements. It follows that present typical continuously operating mechanical and/or dynamic braking systems fail to provide means for controlling the application of braking forces during the entire deceleration of the motor until it comes to a stop.

SUMMARY OF THE INVENTION

The present invention is related to the precise control of an operating parameter of a motor driven utilization device, such as the transport of a tape, during deceleration of the motor after a power failure. In a preferred embodiment of the invention arranged to control the deceleration of a tape driving motor of a tape recording and/or reproducing apparatus, controlled deceleration is effected upon a power failure occurrence at any tape speed, including high speed tape shuttle speeds.

Broadly stated, an exemplary construction embodying principles of the present invention, includes a power fail detection system coupled to the power supply system that provides operating power to a motor driven utilization device, such as a tape driving motor of tape transport apparatus. The power fail detection system detects the occurrence of a power failure and effects a controlled deceleration of the motor. Typically, the tape transport apparatus includes a tape reel drive system having at least one electric motor of the permanent magnet variety coupled to drive each tape reel carrying tape, namely, a tape take-up reel and a tape supply reel. The tape reel drive system usually operates to maintain the desired tape tension as the tape is transported under the control of a capstan during record or reproduce operations. During other operations, such as high speed tape shuttle, however, the transport of the tape is controlled by either the tape reel or capstan drive systems. In any case, the operation of the tape reel drive system is servo controlled in accordance with the tension of the tape detected by a tape tension sensing means, such as, for example, a pivoted tape tension arm. The position of the arm is responsive to the tension in the tape to generate an error signal that is coupled to servo the tape reel drive system to compensate for tape tension errors. The error signal is of a magnitude and sign that indicates the extent and direction of the tape tension arm's deviation from a predetermined nominal position and is compared to a signal indicative of the drive then being supplied to the tape reel drive motor, to generate an error signal indicative of the motor drive required to restore the tension to its nominal position. The electrical system of the tape transport apparatus ordinarily includes a local power supply that derives from a main power source a plurality of different voltages for operating the tape transport apparatus, including some for powering the reel drive system.

In accordance with the present invention, the power fail system is coupled to detect a power failure in the power supply system and responsively effect the controlled deceleration to stop of a motor driving a motor driven utilization device. The power fail system comprises a monitor for detecting power failure that is coupled to sense the supplied power and respond to a power failure by generating a power fail signal. The power fail signal is generated by the monitor whenever the voltage provided by the monitored power supply system remains less than a predetermined voltage for an interval selected to be indicative of the occurrence of a power failure. The power fail signal is coupled to activate a power interrupt circuit which responsively interrupts the provision of energy to the motor driven utilization device except for that which is necessary to operate the motor drive system to decelerate the motor to a stop under controlled conditions, thereby conserving power.

The power fail system further provides means for effecting controlled dynamic braking of the motors which drive the utilization device. More particularly, continuously controlled braking of the motor during deceleration thereof to a stop is provided by selectively interrupting the dynamic braking process at controlled intervals, i.e., by controlling the consumption of energy by selectively controlling the intervals of dynamic braking.

More particularly, when the power to the motor is interrupted, the motor's rotating coil generates a back EMF voltage in the coil. The motor accordingly will operate in its generator mode, generating voltage during the time it is decelerating. If power is taken out of the motor by putting a load across the coil then, according to well understood electromechanical principles, the motor is subjected to a dynamic braking torque. The greater the power supplied by the motor to the external load, the greater is the torque. The dynamic braking then is applied by the selectively interrupted braking scheme of previous mention.

The present invention further contemplates an energy storage device, such as a capacitor with an associated time constant, a battery, a mechanical flywheel, etc., whereby under given conditions, the energy storage device receives energy from the motor apparatus for the interval needed to control the deceleration of the motor to a full stop. Thus, the stored electrical energy in the power supply system at the instant of power failure may be augmented by electrical energy generated during the process of braking the motor.

During normal operation of a tape reel drive system, power flow to and from the reel drive motor is controlled in accordance with error signals representative of a given relationship between the sensed tape tension variations and the motor torque or current. After the occurrence of a power failure, the sensing of tape tension and torque is continued to generate representative error signals that are employed to control the dynamic braking applied to the motor to decelerate it to a stop. The motor braking accordingly will be controlled by the error signals and in consequence the tape tension is kept at its nominal value during the time the tape is decelerated under control to a stop. Power for controlling the braking is partially provided by the motor during braking in accordance with one of the principles of the present invention.

It is therefore an object of this invention to provide circuitry for controlling the deceleration of a motor in a motor servo drive system during the time after power fail when the motor driven utilization device may be subjected to harmful forces. For example, in motor driven tape drive systems, the tape is often subjected to large tensile forces or may be spilled from the reels upon the occurrence of a power failure.

It is another object of this invention to provide power for controlling tension in a tape drive system after power failure by the controlled dynamic braking of a tape transport motor.

Another object is to provide controlled deceleration to stop of a permanent magnetic type of motor, in the event of a power failure.

These and other objects, features and advantages of the present invention will be apparent in the following description of a specific construction of an embodiment as illustrated in the accompanying drawings.

FIG. 1 schematically illustrates a tape drive system containing a power fail system constructed in accordance with the principles of the present invention;

FIG. 2 schematically illustrates the missing cycle alarm generator shown as a block in FIG. 1;

FIG. 3 is a circuit diagram of a specific construction of the missing cycle alarm generator shown schematically in FIG. 2

FIG. 4 schematically illustrates a bidirectional motor drive amplifier system and local power supply shown as blocks in FIG. 1;

FIG. 5 is a circuit diagram of a specific construction of the motor drive control signal generator shown as a block in FIG. 4 and a part of the servo and drive section shown as a block in FIGS. 1 and 4; and FIG. 6 is a simplified schematic diagram of an embodiment of the bidirectional motor drive amplifier shown as a block in FIG. 4.

The power fail system of the present invention will be described with a preferred embodiment arranged to protect motors and motor driven tape transports of a tape recording and reproducing apparatus. It will be appreciated, however, that the power fail system of the present invention can be arranged to protect motors and operatively associated motor driven utilization devices of other apparatus as well.

As illustrated schematically in FIG. 1 a tape transport apparatus containing a power fail system in accordance with the present invention includes a local power supply 10 that generates appropriate DC and AC voltages from a main AC power source 12. The supply 10 ordinarily is coupled to the tape transport apparatus by a transformer 14. It should be appreciated, however, that the power fail system of the present invention can be adapted to function in tape transport apparatus operated from DC main power sources, as well as such apparatus designed to be powered by only AC or DC voltages. In any case, the various voltages generated by the power supply 10 are carried within the tape transport apparatus by a power bus 16 which includes specific DC voltages illustrated in FIG. 1. In normal operation, the power bus supplies power to a servo and drive section 18 which has among its functions the generation of tape tension related error signals on an error bus 20. In the preferred embodiment, the error signals represent the position of the aforementioned tape tension arm. Alternatively, the error signals can be obtained through the use of other tape tension sensing mechanisms associated with the tape drive servos or other mechanisms for detecting the direction and tension of the transported tape. In any case, tape tension related signals are coupled from the tape tension sensing mechanism to the servo and drive section 18 over lines 19. These signals, together with a motor current feedback signal received over line 21, are employed to generate error signals indicative of the motor drive required to eliminate tape tension errors. The error signals are impressed on the error bus 20 extending to the bidirectional motor drive amplifier (MDA) system 22 for the purpose of controlling the motor current to maintain the tape tension at a desired value while the tape is transported at a desired speed. The MDA system 22 responds to the error signals by controlling the energization of the reel drive motor 26 which, in the preferred embodiment, is 70 volts of DC (VDC) power fed to an armature coil 24 of a permanent magnet DC reel drive motor 26.

The power fail system 30 of the illustrated embodiment includes a missing cycle alarm generator 32 and components of the bidirectional MDA system 22. The missing cycle alarm generator 32 samples the voltage generated by the main power supply 12 through a 24 volts of AC (VAC) pick-off coil 34 of the transformer 14. The missing cycle alarm generator detects and responds to the absence of power from the main supply 12 for an interval corresponding to either 1 or 2 half cycles of the power supply frequency depending, respectively, whether a CAPSTAN FAST signal from the servo and drive section 18 indicates that the tape is transported at either a high or low speed. The CAPSTAN FAST signal is generated by a latch circuit coupled to an output of a monostable multivibrator (neither shown in the drawings). The latch is clocked by each capstan tachometer pulse to transfer the logic level of the output of the monostable multivibrator. A CAPSTAN FAST signal is generated by the latch if the monostable multivibrator is still in its quasi-stable conduction state after being triggered by a first capstan tachometer upon the clocking of the latch by the next capstan tachometer pulse. Because low speed operation is less critical in terms of tensile forces on the transported tape or spillage of tape from a reel, the system can be more tolerant of brief power interruptions in that case and hence, the delivery of power to the tape transport apparatus is interrupted only in the event of the occurrence of a full cycle rather than a half cycle interruption of power from the main supply 12.

Upon detection of a loss of power for the requisite number of cycles of power supply frequency at the sampling coil 34, the missing cycle alarm generator 32 supplies a timed sequence of POWER FAIL signals to the servo and drive section 18 and to the local power supply 10, to interrupt the delivery of power to thereby inactivate tape transport apparatus electronic systems unnecessary to the controlled deceleration of the tape to a stop, thereby conserving power. In addition, a POWER FAIL signal is provided by the missing cycle alarm generator 32 in the event of certain catastrophic failures in the power supply system, as will be described further hereinafter, to interrupt the delivery of all power to the tape transport apparatus, including the motor drive circuit, under circumstances when the apparatus itself may be damaged by momentary continued operation following such a catastrophic power supply failure.

Upon generation of the aforesaid sequence of POWER FAIL signals from the missing cycle alarm generator 32, the servo and drive section 18 responsively generates and transmits a CRASH* signal (shown in FIG. 1 as "CRASH" with an overline to indicate a logical complement) to the bidirectional MDA system 22. The DC voltages will meanwhile continue to be available for a short time after main power failure because of the inherent energy storage of the capacitance of the component of the power supply 10.

Upon receipt of the CRASH* signal from the servo and drive section 18, the bidirectional MDA system 22 disables the provision of drive power to the motor 26, so that the motor is no longer under power. Following the disabling of the provision of drive power, the motor 26 continues to rotate because of its own inertia. At that time, the motor 26 functions as a generator and generates a back EMF voltage across the terminals of the armature coil 24, which, in conjunction with the tape tension error signals, initiates dynamic braking to cause the motor to decelerate. If the energy generated by the reel and motor apparatus is greater than the energy lost through resistive losses in the circuit, then the excess energy is supplied to an energy storage device in circuit with the +70 volt line of the power supply 10. This has the effect of transferring any excess kinetic energy of the rotating motor 26 at the time of a power failure to augment the electrical energy stored in the power supply 10. This energy transfer is controlled in response to the tape tension related error signals provided on the error bus 20. The transferred energy is available for momentary continued control of the operation of the reel servo system to effect the controlled deceleration to a full stop.

While the power fail system of the preferred embodiment functions to store the kinetic energy of the motor 26 in an electronic energy storage device, such as the capacitor in circuit with the power supply 10, it is contemplated that other electronic or even mechanical energy storage devices could be employed to store the kinetic energy for use in powering the necessary elements of the tape transport apparatus to effect the controlled deceleration of the transported tape. For example, a rechargeable storage battery may be coupled in circuit with the power supply 10 to deliver power to the tape transport apparatus for controlled deceleration of the tape and to be recharged by the motor current fed back as described hereinbefore. Further, a mechanical flywheel linked by a controllable clutch to the motor 26, may be coupled to a mechanical-to-electrical energy converter to deliver augmenting power to the energy storage device to effect the desired controlled deceleration of the transported tape. In such mechanical systems, the clutch is operable to decouple the flywheel from the tape reel and motor upon the detection of a power failure.

It should be appreciated that many tape transport apparatus include tape supply and tape take-up reels driven under reel servo tape tension control, whereby the tape is selectively transported in either direction between the tape reels. In such apparatus, two motors 26 are provided, each powered by its own bidirectional MDA system 22 from the power supply 10, and each having its own servo and drive section 18 and operatively associated tape tension sensing mechanisms.

It may be seen from the foregoing broad description that a power fail system for a power supply system driving at least one electric motor of permanent magnet type, in response to a controlled servo, said motor servo controlled with reference to at least one electrical error signal indicative of deviations from a selected motor operating condition, comprises:

monitor means for monitoring the power supplied by the power supply system to operate the motor and the control servo for detecting a failure in the supply of the power and responding to the failure by generating a power fail signal;

power supply interrupt means responsive to said power fail signal for interrupting the supply of power to the motor while momentarily providing power to the servo for continued generation of the electrical error signal and to the power fail system for operating the power fail system for an interval corresponding to the time required to stop the motor; and a circuit means responsive to the occurrence of said power fail signal and said error signal for controlled application of dynamic braking of the electric motor during deceleration to stop.

A further combination of the invention includes an energy storage device coupled to the motor, wherein the power supply interrupt means is responsive to the power fail signal for receiving and storing excess kinetic energy of the motor, and for energizing said servo and power supply interrupt means with the stored kinetic energy to extend the duration of controlled dynamic braking.

A preferred embodiment of the power fail system 30 is illustrated in FIGS. 2 through 6. FIG. 2 shows a functional block diagram of an embodiment of the missing cycle alarm generator 32. Voltage across the pick-off coil 34 is coupled for full wave rectification by a full wave rectifier 40. The rectified voltage is fed to a square wave generator 42, which generates a square wave signal at twice the frequency of the voltage signal across the coil 34. In a tape transport apparatus constructed for operation in a 60 Hertz (Hz) power supply system, the frequency of the voltage signal across the pick-off coil 34 is 60 Hz and hence, the frequency of the square wave signal is 120 Hz. The square wave oscillates by making a rising and falling transition during each half cycle that the level of the full wave rectified voltage exceeds a threshold value characteristic of the square wave generator 42, which in the preferred embodiment is selected to be fifty percent of the peak value of the rectified voltage. The square wave generator 42 provides a square wave output to a missing square wave detector 44, which also responds to the CAPSTAN FAST signal from the servo and drive section 18. The missing square wave detector 44 activates an alarm generator 46 when the square wave fails to oscillate for an interval of one-half cycle of the voltage signal at the coil 34 in the case that CAPSTAN FAST is in a logical high state, and for an interval of two adjacent half cycles of the voltage signal in the event that the CAPSTAN FAST line is in a logical low state. A logical high CAPSTAN FAST signal is generated by the servo and drive section 18 when the tape transport apparatus is activated by the operator to cause the tape to be transported at a high shuttle speed. At other lower tape transport speeds, a logical low CAPSTAN FAST signal is generated.

The alarm generator 46 generates the previously described POWER FAIL signals including POWER FAIL SYSTEM, POWER FAIL SERVOS and POWER FAIL REGULATOR when enabled by the missing square wave detector 44. Once generated, the generation of the POWER FAIL signals is not terminated, even when power is restored, until a MOTOR STOPPED* line carries a low signal to indicate that all motors of the system, including motor 26, are stopped. The logical level on the MOTOR STOPPED* line is determined by a latch and monostable multivibrator circuit arrangement (not shown in the drawings) for each reel motor and capstan motor controlled, of the kind described hereinbefore with reference to the CAPSTAN FAST signal, except reel tachometer pulses are employed as the clocking signal. The time constant of each monostable multivibrator of the circuit arrangement is selected so that above a selected very low speed at which the associated reel motor can be considered stopped, the multivibrator will not complete its quasi-stable conduction before the receipt of the next reel tachometer pulse. Therefore, the following latch will be clocked to latch to its output the logical level associated with the quasi-stable conduction state of the monostable multivibrator. As long as one of such circuits associated with the reel motors or capstan motor provides such logical level at its output, the logical high level signal is placed on the MOTOR STOPPED* line. If none of the circuits provides such logical level output, all motors including the reel motors are considered stopped and a logical low level signal is placed on the MOTOR STOPPED* line.

Although a separate pick-off coil 34 is depicted herein to provide the voltage to the rectifier 40, the secondary coil of the transformer 14 may be used, or the voltage may be fed directly to the rectifier 40.

FIG. 3 illustrates a specific construction of the missing cycle alarm generator 32 embodiment illustrated in FIG. 2. In the specific construction the missing square wave detector 44 includes a pair of cascaded retriggerable monostable multivibrators indicated in the figure as U1, which is a MC14538 CMOS dual monostable multivibrator device manufactured by Motorola Corporation. The first of the cascaded retriggerable monostable multivibrators U1 has a first trigger input A at pin 4 coupled to the output of the square wave generator 42 to be triggered to its quasi-stable conduction state upon the occurrence of each rising transition of the square wave signal provided by the square wave generator. This places a logical low level on the Q* output at pin 7. As long as the first monostable multivibrator U1 is retriggered by the square wave signal before the timing-out of its quasi-stable conduction state determined by the RC network coupled between pins 1 and 2 of the multivibrator, pin 7 remains at a logical low level and no POWER FAIL signals are generated. If a power failure occurs in the main AC power source 12 (FIG. 1) lasting for an interval longer than the quasi-stable conduction period, the full wave rectifier 40 fails to provide the required input to the square wave generator 42 formed by the interconnected transistors Q2 and Q5. The square wave generator 42 fails to oscillate, thereby failing to provide rising transitions to pin 4 of the first monostable multivibrator U1. As a result, the Q* output at pin 7 of the monostable multivibrator is allowed to execute a logical low to logical high transition. This transition initiates the generation of the sequence of POWER FAIL signals by further circuitry to be described hereinafter.

If a power failure occurs during the transport of the tape at high shuttle speeds, the logical high CAPSTAN FAST signal gates the diode CR1 on, to connect the two resistor R3 and R4 in parallel relative to the local power supply, thereby providing a short quasi-stable condition period determined by the time constant determining circuit connected to pins 1 and 2 of the first monostable multivibrator U1. In this circuit configuration, the duration of the quasi-stable conduction state of the first monostable multivibrator U1 is greater than the interval between successive logical low to logical high transitions provided by the square wave generator 42, but less than the interval between three such consecutive transitions. Consequently, the Q* output at pin 7 of the first monostable multivibrator U1 executes the logical low to logical high transition that initiates the generation of the sequence of POWER FAIL signals whenever the square wave generator fails to execute a single logical low to logical high transition, which is indicative of a power failure in the main AC power source 12 (FIG. 1) for an interval of one-half cycle at its 60 Hz supply frequency.

During the transport of tape at other lower speeds, the CAPSTAN FAST signal is at a logical low level, gating the diode CR1 off to thereby decouple the resistor R3 from the time constant determining circuit of the first monostable multivibrator U1. This increases the duration of the quasi-stable conduction state of the first monostable multivibrator U1 so that it is greater than the interval between three consecutive logical low to logical high transitions provided by the square wave generator 42, but less than the interval between four such consecutive transitions. In this circuit configuration, the Q* output at pin 7 of the first monostable multivibrator U1 initiates the generation of the sequence of POWER FAIL signals as described hereinbefore whenever the square wave generator 42 fails to execute two consecutive logical low to logical high transitions, which is indicative of a power failure in the main AC power source 12 (FIG. 1) for an interval of one cycle at its 60 Hz supply frequency.

The specific construction also includes a pair of flip-flops, such as a 4013 dual flip-flop, manufactured by National Semiconductor Corporation, and indicated in the figure as U2. The two flip-flops and associated circuitry to be described hereinafter form the alarm generator 46. The Q output at U2-1 is normally low and is set high by a high signal on its set terminal U2-6 and is reset low either by a high signal on its reset terminal U2-7 or a low to high transition on its clock terminal U2-3. Conversely, the Q output at U2-13 is reset low by a high signal on its reset terminal U2-10 and is set high by a low to high transition on its clock terminal U2-11. The Q output of the flip-flop U2 at pin 1 generates a logical high level POWER FAIL SERVOS signal immediately upon the detection of a power failure in the main AC power source 12 (FIG. 1) as a result of a logical high at the Q* output of the first monostable multivibrator U2 at pin 7, which is coupled to the set terminal U2-6 of the flip-flop U2. Simultaneously, the FET gate Q3 generates a logical high level POWER FAIL SYSTEM signal as a result of the disabling logical low received on the gate electrode of the gate from the Q* output of the flip-flop at pin U2-2.

With respect to the POWER FAIL REGULATOR signal, however, its generation is delayed momentarily to allow the execution of a typical tape transport shutdown sequence before interrupting the supply of power to the tape transport apparatus not required for the controlled deceleration of tape to stop. This is accomplished by the second of the cascaded monostable multivibrators U1 coupled between the Q output pin 7 of the first monostable multivibrator U1 and the clock terminal pin 11 of the flip-flop U2. The second monostable multivibrator includes a time constant determining circuit coupled between pins 14 and 15 that is controlled in conjunction with the time constant determining circuit associated with the first monostable multivibrator to provide different durations of quasi-stable conduction states, depending upon the speed of transport of the tape when a power failure occurs. However, the duration of each of the two possible quasi-stable conduction states of the second monostable multivibrator is shorter than the corresponding duration of the quasi-stable conduction state of the first monostable multivibrator so that a delay of five milliseconds (ms) is provided when the diode CR2 is gated on by the CAPSTAN FAST signal, and a delay of 50 ms is provided when the diode CR2 is gated off by the CAPSTAN FAST signal. In any case, the second monostable multivibrator U1 is triggered into its quasi-stable conduction state upon receipt at input A, pin 12 of the logical low to logical high transition executed at the Q* output of the first monostable multivibrator U1 at pin 7 when a power failure condition occurs as described hereinbefore. At the end of the quasi-stable conduction state of the second monostable multivibrator U1, it's Q* output at pin 9 goes from a logical low to logical high condition, which results in clocking the flip-flop U2 Q output pin 13 to a high state, thereby gating-on the FET gate Q1 to provide the logical low level POWER FAIL REGULATOR signal delayed in time as desired.

Additional circuitry is included in the missing cycle alarm generator 32 to detect and control the delivery of power to the tape transport apparatus in the event of a catastrophic failure, or during a power-up operation following an occurrence of a power failure in the main AC power source 12 (FIG. 1). More specifically, the transistor Q6 and its associated circuitry insure that U2-7 is reset when power is first turned on. A high output on OR-gate U6-10 is coupled to the bidirectional MDA system 22 (FIGS. 1 and 6) to maintain the switching motor drive amplifiers associated with the tape reel drive motors operating during a power failure in the main AC power source (FIG. 1). This is accomplished by the FET gate Q4, which is gated off by the logical low level signal generated at the Q* output of the flip flop U2 at pin 2 when the power failure is detected. This places a logical high level signal on one input U6-9 of the two inputs to the OR-gate, hence, on the output U6-10 as well. The OR-gate has a second input U6-8 coupled to a voltage comparator U5 which monitors the −12 volt line of the local power supply 10 (FIG. 1).

As will be described hereinafter, other voltage comparators (not shown) are provided to monitor the other voltage lines of the local power supply. A failure in the local power supply can lead to catastrophic failures in the tape transport apparatus that are far more harmful than tape spillage or damage. Consequently, should voltage comparator U5 (or any one of the other voltage comparators not illustrated) detect a power loss in the monitored voltage line, a logical low level signal is provided at its output, which in voltage comparator U5 appears on pin 10. With respect to each voltage comparator, such as U5, that monitors a voltage that is to be interrupted upon the occurrence of a power failure in the main AC power source 10 (FIG. 1), which in the preferred embodiment includes +12 volt, −12 volt and a +5 volt supplies, the output thereof is coupled to the second input of an OR-gate, such as OR-gate U6. The first input of each such OR-gate is coupled to the output of the FET gate Q4, as previously described. During normal tape transport apparatus operations, without a power failure in the main AC power source 10 (FIG. 1), the FET gate Q4 is gated on, which places a logical low level signal on the first input of each of the aforedescribed OR-gates, such as pin 9 of OR-gate U6. The combination of this OR-gate inputs with a logical low level signal OR-gate input from the associated line voltage comparator U5 upon the occurrence of a power failure in the local power supply 10 (FIG. 1) results in the generation of the logical low level REGULATOR FAIL signal at pin 10 of OR-gate U6. This signal is coupled to one of the inputs 43 of a NAND-gate 45, which receives the outputs of other OR-gates and line-monitoring voltage comparators (unassociated with an OR-gate) over lines 47. If the NAND gate 45 receives a REGULATOR FAIL signal from any one of the OR-gates or line-monitoring voltage comparators, it issues a corresponding logical high level REGULATOR FAIL signal over line 49, which is coupled to the bidirectional MDA system 22 (FIGS. 1 and 6) to disable the switching motor drive amplifiers.

With reference to the OR-gate U3, it receives two inputs; one from the output of the square wave generator 42 at input U3-1 and another from the MOTOR STOPPED* line at U3-2. While the motors driving the tape reels and the capstan are rotating, a logical high level signal is present on the MOTOR STOPPED* line. After the occurrence of a power failure is detected, the OR-gate U3 blocks the passage of further logical low to logical high signal transitions from the square wave generator 42 to the clock terminal U2-3 of the flip-flop U2 until the logical high level signal is removed from the MOTOR STOPPED* line. This occurs only after all reel motors and capstan motor have stopped, which is indicated by the presence of a logical low level signal on the MOTOR STOPPED* line, as described hereinbefore. Consequently, the missing cycle alarm generator 32 also functions to protect the tape transport apparatus by preventing the square wave generator 42 from setting the flip-flop U2 in an operating condition that removes the power fail signals it controls until the occurrence of the first logical low to logical high square wave signal transition after all motors have stopped. When the motors have stopped, a logical low level signal is placed on the MOTOR STOPPED* line, which releases the output U3-3 of the OR-gate U3 from being locked at a high logical level and, thereby permits the OR-gate to pass to the following flip-flop U2 the logical low to logical high transitions generated by the square wave generator 42.

It may be seen from FIG. 3 that the POWER FAIL signals are turned on in sequence. Pin U1-7 of the first monostable multivibrator goes high when the requisite number of missing square wave transitions are detected thereby setting the output U2-1 of the flip-flop U2, the POWER FAIL SERVOS signal, high. At substantially the same time, the output U2-2 of the flip-flop goes low and shuts off FET gate Q3 to effect the generation of a high POWER FAIL SYSTEM signal. The second monostable multivibrator U-1, however, interposes a time delay, as previously described before the POWER FAIL REGULATOR signal is issued. As described in more detail hereinafter with reference to FIG. 5, the POWER FAIL SERVOS signal causes the generation of a CRASH* signal by the servo and drive section 18 that is coupled to the bidirectional MDA system 22 to disable the provision of power to the motor 26 by. the local power supply 10 (FIGS. 4, 5 and 6). The POWER FAIL SYSTEM signal is coupled to the system control for the initiation of a power-down sequence elsewhere in the tape transport apparatus.

Thus, as shown in FIG. 4, the POWER FAIL REGULATOR signal is coupled to series pass voltage regulator 91 of the local power supply 10 that supplies supply voltages to parts of the tape transport apparatus other than that required to effect a controlled deceleration of the tape to stop. As illustrated in FIG. 4, the local power supply 10 includes a full wave rectifier 93 that is coupled to the main AC power source 12 by the transformer 14 (FIG. 1) to generate +70 VDC across the rectifier's output capacitor 61, which also serves as the energy storage device for receiving the excess kinetic energy from the motor 26 upon the occurrence of a power failure in the source 12. The details of this function of the capacitor 61 is described in further detail hereinafter with reference to FIG. 6. The +70 VDC output provided by the full wave rectifier is coupled to a following DC to DC converter 95, which together with the full wave rectifier defines the local power supply 10 which provides the voltage supplies required to operate the reel drive motors and associated control circuitry. Upon the occurrence of a power failure in the main AC power source 12, the DC to DC converter 95 continues to supply the indicated supply voltages, as long as the capacitor 61 is able to supply the needed energy to the converter.

FIG. 4 is a logical block diagram of the bidirectional MDA system 22, illustrating its operative association with the servo and drive section 18 and local power supply 10. A bidirectional motor drive amplifier 50 controls the current flow to and from the motor 26 in response to signals from a motor drive control signal generator 52. The bidirectional motor drive amplifier 50 takes the current from the aforementioned energy storage device 61, which in the preferred embodiment is a capacitor coupled to the +70 volt line and thence to the motor 26 when the motor 26 is driven in its motor mode. However, current may be conducted back to the capacitor 61 in the +70 volt supply from the motor 26 when the motor 26 is operating in its dynamic braking, i.e., generator, mode. Thus, the bidirectional motor drive amplifier 50 relates to the motor 26 both as a current supply and as a current sink. In normal operation, the bidirectional motor drive amplifier 50 functions as both a current supply and a current sink to accelerate and decelerate the motor 26 under control, as required by error signals supplied on the error bus 20. When a CRASH* signal is received by the control signal generator 52 from the servo and drive section 18 upon the occurrence of a power failure in the main AC power source 12, however, the current supply is disabled and only the current sink is active, as will be described further hereinafter, to receive and store in capacitor 61 the transfer of kinetic energy of the motor 26 under the control of the error signals.

FIG. 5 illustrates a specific construction of the motor drive control signal generator 52 and the portion of a reel servo and drive system 18 adapted to cooperate with the preferred embodiment of the power fail system 30 of the present invention. The control signal generator 52 and cooperating reel servo and drive system 18 are arranged to control the drive of one motor 26. If more than one motor is to be controlled in accordance with the present invention, a second combination of reel servo and drive system 18, control signal generator 52 and bidirectional motor drive amplifier 50 is provided in operative association with the local power supply 10 and missing cycle alarm generator 32 (FIGS. 1, 2 and 3).

Referring first to the reel servo and drive system 18, the tape tension mechanism 62 provides a signal on the line 19a whose magnitude and sense is indicative of the tape tension of the transported tape. The tape tension mechanism 62 can be of a known type and typically includes a pivoted arm engaging the tape whose position is a function of tape tension and which is mechanically linked to an electrical device, represented by a potentiometer in FIG. 5 and operable to provide an electrical signal representative of the tape tension. The tape tension related signal on line 19a is amplified by a preamplifier 63 and is coupled to the input of a frequency compensation circuit 65, which stabilizes the tape tension servo loop against closed loop servo oscillation.

The frequency compensated tape tension signal is coupled to one input of a summing junction 67, the second input of which is coupled to line 21 which receives a motor current feedback signal from the bidirectional motor drive amplifier 50 which is indicative of the magnitude and sense of the current of the motor 26 being controlled. The summed signal is indicative of the motor drive required to compensate for the tape tension error indicated by the tape tension error signal. This signal is coupled to a reel motor drive control signal generator 52 including an integrator 69 and a following set of four voltage summers 71 coupled in parallel to the output of the integrator 69. The output of the integrator 69 is a ramp signal whose slope is proportional to the reel drive error signal that controls the voltage and current applied to the motor 26, which is determined by the bidirectional motor drive amplifier 50. Each of the four voltage summers 71 receives a different one of the reference voltages REF. 1 to REF. 4 and functions to add a DC voltage offset of selected magnitude and sense to the ramp signal provided by the integrator 69. The reference voltages are selected to effect the desired switching of current control switches (Q37, 38, 48 and 49 in FIG. 6) in the bidirectional MDA 50 for forward and reverse motor operations. The outputs of the voltage summers 71 are coupled respectively by lines 73-76 to one input of the differential comparators U6, U7, U9 and U10, which may be formed by LM 311 differential comparators manufactured by National Semiconductor Corporation. The other input of each of the comparators receives a triangular voltage signal (which in the preferred embodiment is a 50 KHz rate signal) that together with DC offset ramp signals at their aforementioned other input determine the logical state of the outputs of the comparators. As will be described hereinafter, the comparators determine, through control of the bidirectional motor drive amplifier 50, the duty cycle of power transfer between the motor 26 and the local power supply 10 (FIG. 4) and, hence, the speed and acceleration (or deceleration) of the motor.

The servo and drive system 18 also includes logic circuitry responsive to the POWER FAIL SERVOS signal generated by the missing cycle alarm generator 32 and a minimum tape tension representative signal to generate a CRASH* signal which is transmitted to inputs U9-6 and U10-6, of the two comparators U9 and U10. These comparators enable the delivery of current from the local power supply 10 (FIG. 4) to the motor 26. Hence, when a power failure occurs in the local power supply, the logical high POWER FAIL SERVOS signal coupled to the input of the NOR-gate 78 and causes the CRASH* signal to be issued by the NOR-gate to a cascaded pair of amplifiers Q25 and Q26, which places a logical low level signal on the line 79 that enables the diodes CR15 and CR16 and disables the comparators U9 and U10. These comparators are similarly disabled when the output of the preamplifier 63 is at a level representative of minimum tape tension in the tape. This condition is detected by the comparator 81, which provides a logical high level signal to the second input of the NOR-gate 78 whenever the tape tension signal received by the comparator corresponds to a tension arm position that corresponds to a minimum tape tension condition, as determined by the reference input to the comparator.

Referring now to both FIGS. 5 and 6, it is seen that comparator U9 controls a transistor switch Q38 and the comparator U10 controls a transistor switch Q49, which in turn respectively control the delivery of current from the 70 VDC supply to the armature coil 24 of the motor 26. Thus, when U9 and U10 are disabled it is no longer possible to supply current to the coil 24.

Comparators U6 and U7 control transistor switches Q37 and Q48, respectively, to control the current flow direction through the coil 24 and dynamic braking of the motor 26. The transistor switch Q48 cooperates with the transistor switch Q38 to control the current flow from the 70 VDC power supply through the coil when the motor 26 is driven in the reverse direction. The transistor switch Q37 cooperates with the transistor switch Q49 to control such current flow when the motor 26 is driven in the forward direction.

As will be described hereinafter in further detail, the comparators U6 and U7 are controlled during a power failure in the local power supply 10 (FIG. 4) to modulate the dynamic braking interval of the motor 26 and to control the transfer of the excess kinetic energy of the motor 26 to the capacitor 61 of the power supply.

FIG. 6 is a simplified schematic illustration of a conventional bidirectional motor drive amplifier 50 as adapted in accordance with the present invention to effect controlled deceleration of the motor 24 upon the occurrence of a power failure, and transfer of any excess kinetic energy of the motor to the capacitor 61.

As can be seen from FIG. 6, the bidirectional motor drive amplifier 50 is an H-type switching MDA (also called a full wave bridge) arranged to provide pulses of current to a DC motor 26 to effect controlled rotation of the motor in either a forward or reverse direction. The widths of the provided pulses of current are modulated in accordance with the motor drive required to maintain a nominal tension in the transported tape, as determined by the tape tension error signal received on line 19a. An H-type MDA controls the application of the pulses of current through the operation of four transistor switches, Q37, Q38, Q48 and Q49 coupled in the conventional series/parallel circuit configuration between the source of power, namely capacitor 61 of the power supply 10 (FIG. 1), and a ground return path. Two current maintenance diodes CR27 and CR31 are connected in parallel with transistor switches Q37 and Q48, respectively, and two current maintenance diodes CR28 and CR32 are connected in parallel with transistor switches Q38 and Q49, respectively.

To the extent described, the H-type switching MDA 50 operates conventionally to drive the motor 26 by controlling the application of pulses of current between capacitor 61 and ground through coil 24 in a direction depending upon whether the motor 26 is rotated in the forward or reverse direction. In addition, the transistor switches Q37 and Q48 and diodes CR27 and CR31, and also CR28, CR32, operate to define, with coil 24, current loops for the application of dynamic braking forces to the motor 26, depending on the direction of motor rotation. The enabled and disabled states of the transistor switches are controlled by means, such as the differential comparators, U6, U7, U9 and U10, in accordance with the error signal provided to the input of the integrator 69. Each comparator compares the voltage level applied on one of its inputs from triangular voltage generator 60, with the DC offset error voltage received on its other input from its associated summer 71. Whenever the DC offset error voltage is greater than, in the case of comparators U6 and U10, or is less than, in the case of comparators U7 and U9, the voltage provided by the generator 60, the comparator provides an enabling logic state on its output coupled to the associated transistor switch of the H-type MDA 50. The opposite disabling logic state is, of course, provided when the voltage relationship between the signals provided by the generator 60 and summer 71 are the opposite as aforedescribed. The pulse duration of current provided through coil 24 is determined by the interval that the appropriate enabling conditions exist on the output of the differential comparators. For applying drive to rotate the motor 26 in the forward direction, the differential comparators U6, U7 and U10 provide enabling logic state outputs to the transistor switches Q37, Q48 and Q49, with switch Q37 permanently held in the enabled state and switches Q48 and Q49 pulse operated to be in opposite conduction states for intervals depending on the tape tension error signal and the motor current feedback signal. Switch Q49 is enabled to permit the local power supply 10 to provide current to the motor 26 when the driven tape reel associated with the motor requires additional motor drive. Switch Q48 is enabled to effect dynamic braking of the motor when the tape reel requires less drive. With the transistor switches Q37, Q48 and Q49 thusly enabled, current flow through the motor is servo controlled in accordance with the motor drive requirements. Reverse direction drive occurs when transistor switches Q37, Q38 and Q48 receive enabling logic state inputs from the differential comparators U6, U9 and U7. Transistor switches Q37, Q38 and Q48 are operated as described hereinbefore with reference to forward motor drive, except that switch Q48 is permanently held in the enabled state, with switches Q37 and Q38 pulse operated to effect servo control of the motor 26 in accordance with the motor drive requirements.

In a conventionally operated MDA system 22, dynamic braking occurs by permanently (and not in response to tape tension error signal) issuing a stop command to enable the transistor switches Q37 and Q48, whereby current flows in the loop through the coil 24 formed by the enabled transistor switches. Because of the permanent enabling of the dynamic braking determining transistor switches, dynamic braking is continuously applied to the motor 26 during the entire deceleration to stop and hence, is without control.

In accordance with the present invention, the MDA system 22 (FIG. 1) is provided with additional means to effect the servo controlled deceleration of the motor 26. More specifically, the motor drive control signal generator 52 and H-type bidirectional MDA 50 are coupled to be responsive to the occurrence of a power failure to control the deceleration of the motor 26 in accordance with the tension in the transported tape. To this end, the transistor switches Q37 and Q48 remain coupled for control by the differential comparators U6 and U7, respectively, while transistor switches Q38 and 49 are permanently disabled by virtue of the disabling of differential comparators U9 and U10 by the CRASH* signal placed on line 79 of the motor drive control signal generator 52. As a result, the enabled and disabled states of the transistor switches Q37 and 48 remain controllable by the differential comparators U6 and U7, respectively, during the deceleration of the motor 26 in response to the tape tension error signal received on line 19a and the motor current feedback signal received from the MDA 50. The feedback signal is obtained from a resistor 83 connected in series with the armature coil 24 of the motor 26. Each end of the resistor 83 is coupled to one input of a differential amplifier 85, that provides over line 21 the signal representative of the current in the motor 26.

Consequently, the deceleration of the motor 26 is controllable after a power failure, because the control of the enable and disable states of transistor switches Q37 and Q48 permits corresponding control of the application of dynamic braking force to the motor 26. When dynamic braking is caused by the tension error and motor drive feedback signal coupled to the servo and drive section 18, both transistor switches Q37 and Q48 are enabled by the comparators U6 and U7. When the motor 26 is decelerated from being driven in the forward direction, the transistor switch Q37 is held permanently enabled by the output of the differential comparator U6 and the transistor switch Q48 is modulated by the comparator U7 in accordance with the error and feedback signals to effect the controlled dynamic braking of the motor. On the other hand, the transistor switch Q48 is permanently enabled and switch Q37 is modulated to effect the controlled dynamic braking of the motor when the motor is decelerated from being driven in the reverse direction.

As generally described hereinbefore, the power fail system 30 (FIG. 1) of the present invention has the feature of transferring any excess kinetic energy of the rotating motor 26 and associated driven tape reel, to the capacitor 61 of the power supply 10, to augment the energy stored in the capacitor at the time of power failure in the main AC power source 12. In the preferred embodiment of the present invention, this augmentation and the aforementioned controlled deceleration are operatively linked. This operative linking will be described with reference to the occurrence of a power failure while the motor 26 is driven in the forward direction.

As described hereinbefore, when the motor 26 is driven in the forward direction, current flows from the capacitor 61 through the coil 24 to ground via the transistor switches Q49 and Q37. If, after a power failure occurs, the tape tension error signal is indicative of the motor 26 supplying too much drive for the desired tension condition, transistor switch Q49 is disabled and switch Q37 remains enabled. In addition, transistor switch Q48 is enabled by the differential comparator U7 for the appropriate interval during each cycle of the triangular voltage generated by generator 60, as determined by the tape tension error signal and motor current feedback signal. Depending upon the conditions represented by the tension error and current feedback signals, the interval can last as long as the deceleration of the motor or can be as short as a fraction of the 50 KHz period, with the switch Q48 toggling between its enabled and disabled states at the 50 KHz rate.

While the transistor switch Q48 is enabled, the back EMF generated by the motor 26 produces a current that flows around the aforementioned loop defined by the switches Q37 and Q48 through the coil 24 and has the effect of dynamically braking, hence, decelerating the motor.

During motor deceleration intervals when the transistor switch Q48 is disabled, current will continue to flow though the switch Q37, coil 24 and diode CR32, if the energy generated by the motor is greater than the energy losses caused by the resistive losses in the circuit. This current flow, thus, is now from the motor 26 to the capacitor 61 and charges the capacitor, which effects the transfer of motor kinetic energy to stored electrical energy in the capacitor, whereby the capacitor may continue to supply current to the MDA 50 to maintain control of the transistor switches to thus maintain the dynamic braking process until the motor is stopped. The amount of kinetic energy transferred to the capacitor is a function of the speed and inertia of the motor and reel combinations at the time power fail occurs.

It will be appreciated that a transfer of motor kinetic energy to the capacitor 61 can occur during a deceleration of the motor from a reverse motor drive condition. However, current flows through the coil 24 in the directions opposite that when the motor is decelerated from a forward motor drive condition. Moreover, transistor switch Q48 is permanently enabled while switch Q37 toggles, and the capacitor 61 charging path is through the permanently enabled switch Q48 and diode CR28.

From the foregoing, it should be appreciated that the two diodes CR28 and CR32 enable the transfer of motor kinetic energy to the local power supply 10 under certain conditions while the motor 26 is decelerated. This energy transfer would not be possible in the preferred embodiment without the diodes, because the transistor switches Q38 and Q49 are permanently disabled when the motor is to be decelerated to a stop during the power fail process.

In one embodiment of the present invention operated under such power failure conditions, an energy storage capacitor was employed having the capacity to store up to 100 watt-seconds of energy. In the associated tape transport apparatus, it was found about 100 to 300 watt-seconds was required over an interval of 3 to 5 seconds to stop the supply and take-up reels from a high tape shuttle speed of 500 inches per second. In accordance with the present invention, additional energy required to power the necessary elements of the tape transport to effect the controlled deceleration was supplied to the capacitor 61 from the kinetic energy of reels and motors. This increased the interval over which the capacitor 61 was able to power the necessary elements of the tape transport to effect the controlled deceleration to about 10 seconds, or approximately two times that which would have been possible without the kinetic energy transfer. In that embodiment, the DC to DC converter 95 was designed to provide the indicated supply voltages as long as the voltage on the capacitor 61 remained above about 25 volts. As discussed hereinbefore, the amount and ability of the motor 26 to transfer kinetic energy to the capacitor 61 depends inter alia upon the angular velocity of the motor. In the aforementioned embodiment, each motor 26 was able to transfer kinetic energy to the capacitor 61 as long as its angular velocity exceeded about 300 revolutions per minute.

As briefly discussed hereinbefore, the occurrence of a power failure in the local power supply 10 can lead to catastrophic consequences far more harmful than tape spillage or damage. Upon the occurrence of such circumstances, the missing cycle alarm generator 32 (FIG. 1) issues a REGULATOR FAIL signal, which is coupled to the electronic switches SW1, SW2, SW3 and SW4 (FIG. 6) via the line 49, to disable the bidirectional motor MDA 50. Upon such disabling, the controlled motor 26 and transported tape are allowed to decelerate without control.

It will of course be understood that modification of the present invention and its various aspects would be apparent to those skilled in the art. For example, in the described embodiment it is understood that after external power failure, the power to the system would remain as a result of the inherent capacitance in the power supply which would store power during the time necessary to stop the motor 26. Furthermore, while the invention has been described as arranged to operate to provide a controlled deceleration of the tape to stop upon the occurrence of a power failure in the external main AC power source 12 (FIG. 1), it could be adapted to provide similar control upon the intentional operator initiated stop command with or without the occurrence of a power failure anywhere in the power supply system. It is to be appreciated, therefore, that the scope of the invention should not be limited by the particular embodiment and specific construction herein described, but should be defined only by the appended claims and the equivalents thereof.

What is claimed is:

1. A power fail circuit for controlling the deceleration of a tape in a tape transport apparatus, the tape being driven by a motor drive system powered by a source of power and having at least one electric motor driving a reel storing the tape, said motor drive system generating at least one electrical error signal indicative of deviations of the tape from a predetermined tape tension, the power fail circuit comprising:

monitor means for detecting a power failure in the source of power and responding to the power failure by generating a power fail signal, power supply interrupt means responsive to the power fail signal for selectively interrupting the supply of power to the motor to initiate dynamic braking using the energy in the motor in response to the generated electrical error signal; and switching circuit means integral with the power supply interrupt means for the controlled application of dynamic braking to the electric motor by selectively interrupting the dynamic braking process at controlled intervals in response to said power fail signal and said electrical error signal, to maintain substantially the predetermined tape tension during stopping of the tape.

2. A power fail circuit according to claim 1 further including:

energy storage means coupled to the source of power via the power supply interrupt means for storing energy generated via the electric motor and reel in excess of resistive energy losses to extend the controlled duration of said dynamic braking.

3. A power fail circuit according to claim 2 wherein the power source is an AC power source supplying an AC voltage at a selected frequency, and the monitor means includes a square wave generator connected to the source of power for generating a square wave having a frequency that is substantially twice the frequency of the AC voltage.

4. The power fail circuit according to claim 2 wherein the power supply interrupt means further include:

control signal generator means responsive to the power fail signal for selectively controlling the switching circuit means in accordance with the electrical error signal.

5. The power fail circuit according to claim 4 wherein:
said energy storage means include a capacitor coupled to the source of power; and
said switching circuit means include a bidirectional motor drive amplifier coupled to the control signal generator means and responsive thereto for controlled deceleration of the motor upon the occurrence of the power fail signal, and for the transfer of any excess kinetic energy of the motor to the capacitor to maintain control of the dynamic braking until the motor is stopped.

6. The power fail circuit according to claim 5 wherein said control signal generator means include:
means including integrator means for providing a motor drive error signal which reflects the value of the electrical error signal;
voltage summer means coupled to receive the motor drive error signal and for generating switching signals representative of the forward and reverse operating modes of the motor; and
comparator means coupled to the voltage summer means for determining said controlled intervals of operation of the bidirectional motor drive amplifier and thus the power transfer process between the motor, the source of power and the capacitor in accordance with the electrical error signal and the extent of resistive energy losses.

7. A power fail circuit for controlling the deceleration of a tape in a tape transport apparatus, the tape being driven by a motor drive system powered by a source of power and having at least one electric motor driving a reel storing the tape, said motor drive system generating at least one electrical error signal indicative of deviations of the tape from a predetermined tape tension, the power fail circuit comprising:
monitor means for detecting a power failure in the source of power and for generating a power fail signal in response to the power failure;
said power source including an AC power source supplying an AC voltage at a selected frequency;
said monitor means including a square wave generator connected to the source of power for generating a square wave having a frequency that is substantially twice the frequency of the AC voltage;
power supply interrupt means for controlling power transfer to the motor to maintain the predetermined tape tension in response to the generated electrical error signal, and for dynamically braking the electric motor in response to said power fail signal and said electrical error signal to maintain substantially the predetermined tape tension during stopping of the tape; and
energy storage means for storing selected energy via the electric motor and reel for extending the controlled duration of said dynamic braking.

8. A power fail circuit according to claim 7 wherein said square wave generator includes a voltage threshold detector, said threshold detector disabling said square wave generator when the peak voltage level of the source of power is less than a predetermined value.

9. A power fail circuit according to claim 8 wherein the motor drive system comprises a motor drive amplifier, and said power supply interrupt means comprises a control signal generator, wherein said motor drive amplifier is responsive to control signals generated by said control signal generator in response to the error signal and said power fail signal.

10. A power fail circuit according to claim 9 wherein the motor is a DC motor responsive to pulse drive signals, said control signal generator having a DC motor pulse width modulator coupled to the motor drive amplifier to effect the pulse signal.

11. A power fail circuit according to claim 9 wherein said motor drive amplifier comprises source means responsive to the error signal for supplying current to the electric motor and sink means for coupling current from the motor to the energy storage means.

12. A power fail circuit according to claim 9 wherein the power supply interrupt means is responsive to said power fail signal to interrupt the coupling of power from the source of power to the motor while providing power to the motor drive system for continued generation of at least one error signal and for operating said power fail circuit during the deceleration of the motor.

13. A power fail circuit according to claim 8 wherein the square wave signal executes transitions between two signal levels, said monitor means includes a square wave detector and an alarm generator, said alarm generator coupled to said square wave generator and generating said power fail signal in response to said square wave detector detecting the absence of a predetermined number of square wave transitions within a predetermined time.

14. A power fail circuit according to claim 13 further comprising means for changing said predetermined number of square wave transitions according to the speed of the electric motor.

15. A power fail circuit according to claim 13 wherein said square wave detector comprises a monostable multivibrator that provides a signal to said alarm generator for activating the same unless said multivibrator receives a square wave transition of a predetermined direction within a predetermined time.

16. A power fail circuit according to claim 13 wherein said power fail signal is one of a sequence of power fail signals and the time between signals in said sequence varies according to the speed of the motor.

17. In a tape transport apparatus of the type which has a motor coupled to drive a reel storing tape and other power-consuming elements performing other functions of the tape transport apparatus, a servo control for said motor, said servo control generating at least one electrical error signal indicative of deviations of the tape from a predetermined tape tension, and a source of power for supplying power to the tape transport apparatus, a power fail circuit comprising:
monitor means for detecting a power failure in the source of power and responding to the failure by generating a power fail signal,
power supply interrupt means responsive to said power fail signal for interrupting the coupling of power from the source of power to the motor and to said other power consuming elements while providing power to the servo control for continued generation of at least one error signal and for operating said power fail circuit for a selected interval, and
a switching circuit responsive to said power fail signal coupled to the servo control and the motor and to the electrical error signal for maintaining substantially the predetermined tape tension in the absence of a power failure in the source of power by switching power to and from the motor and for dynamically braking the motor after occurrence of said power fail signal to maintain substantially the predetermined tape tension and stop the reel.

18. In a tape transport apparatus having at least a capstan servo, a rotating head servo and a reel servo, a power fail circuit for a tape reel motor drive system powered by an externally supplied power source and having at least one electric motor coupled to a tape reel carrying tape, at least one electrical error signal indicative of tape deviations from a predetermined tape tension, and a local power supply for supplying power from the external power source to the tape transport apparatus, the power fail circuit responding to a failure of the externally supplied power by interrupting the delivery of power from the local power supply to substantially all servos except the reel servo, the power fail circuit comprising a switching circuit to control the kinetic energy of the rotating reel and electric motor to create electrical energy to dynamically brake the electric motor, and an energy storage device coupled to the switching circuit for selectively receiving and storing selected electrical energy to extend the control duration of the dynamic braking.

19. A dynamic braking circuit for dynamically braking a permanent magnet DC motor having coils and coupled to be driven by a servo of a tape transport apparatus in response to a power fail signal indicative of interruption of power supplied to the apparatus, the servo being responsive to a feedback signal indicative of tape tension, comprising:
   activation means for activating said braking circuit in response to the power fail signal;
   connection means connecting said braking circuit to the coils of the motor;
   current control means for continuously controlling the dynamic braking of the motor with energy from the motor by coupling current to the coils thereof in amounts commensurate with the feedback signal in response to said activation means; and
   energy storage means for storing energy generated by the motor in excess of resistive energy losses, said energy storage means supplying the stored energy to extend the duration of the control of the dynamic braking by the current control means.

20. A monitor for responding to a failure of an AC electric power supply comprising:
   means for generating a signal proportional to an AC signal indicative of AC power generated by the power supply and for full wave rectifying the same;
   means responsive to the amplitude of the rectified AC signal for generating a pulse train output signal whenever said rectified signal exceeds a predetermined threshold value relative to the rectified AC signal, and for failing to generate a pulse train output signal when said rectified signal falls below said threshold value; and
   alarm means for generating a power fail signal in response to an absence of at least one predetermined pulse of the pulse train within a predetermined time.

21. A circuit for controlling the deceleration of a motor to a stop, wherein the motor has kinetic energy and controls an operating parameter of a utilization device, comprising:
   means for generating a stop command to initiate the deceleration;
   means for continuously generating an error signal indicative of the operating parameters during the deceleration;
   motor drive means for converting the energy of the motor to electrical energy and for selectively applying the generated electrical energy to the motor to define a motor dynamic braking force;
   means responsive to the stop command and the error signal for continuously controlling the application of the dynamic braking force to the motor in response to the continuously generated error signal; and
   energy storage means for receiving and storing energy from the motor in excess of resistive energy losses in the circuit in response to the stop command.

22. The circuit of claim 21 wherein the stop command corresponds to a power fail signal generated in response to a cessation of power and the error signal corresponds to a tension error signal from the utilization device.

23. The circuit of claim 22 wherein:
   the dynamic braking is applied to the motor during a deceleration-to-stop interval determined by the error signal; and
   the excess kinetic energy delivered to the energy storage means from the motor extends the continuous control of the dynamic braking over the deceleration-to-stop interval.

24. The circuit of claim 21 wherein:
   said utilization device comprises tape transporting means;
   said operating parameter comprises the transporting of tape by the tape transporting means; and
   said means for generating an error signal comprises tape tension sensing means.

* * * * *